US008976950B2

(12) United States Patent
Kramarenko et al.

(10) Patent No.: US 8,976,950 B2
(45) Date of Patent: Mar. 10, 2015

(54) EXPEDITED MEDIA INTERCONNECTION IN THIRD PARTY CALL CONTROL

(75) Inventors: Valentina Iqorevna Kramarenko, Mississauga (CA); Richard John George, Waterloo (CA); Haiyang Yin, Waterloo (CA)

(73) Assignee: Blackberry Limited, Waterloo (CA)

( * ) Notice: Subject to any disclaimer, the term of this patent is extended or adjusted under 35 U.S.C. 154(b) by 1377 days.

(21) Appl. No.: 12/693,325

(22) Filed: Jan. 25, 2010

(65) Prior Publication Data
US 2011/0182416 A1 Jul. 28, 2011

(51) Int. Cl.
H04M 3/42 (2006.01)
H04L 29/06 (2006.01)

(52) U.S. Cl.
CPC ....... *H04M 3/42314* (2013.01); *H04L 65/1006* (2013.01); *H04L 65/1053* (2013.01); *H04L 65/1069* (2013.01); *H04L 65/403* (2013.01)
USPC ...................................... 379/207.02; 370/352

(58) Field of Classification Search
USPC ...................................... 379/207.02; 370/352
See application file for complete search history.

(56) References Cited

U.S. PATENT DOCUMENTS

| 5,452,349 | A * | 9/1995 | Uehara et al. ............. 379/220.01 |
| 2005/0083948 | A1* | 4/2005 | Hiroshima et al. ....... 370/395.52 |
| 2007/0091898 | A1* | 4/2007 | Rengaraju et al. ....... 370/395.21 |
| 2007/0201459 | A1* | 8/2007 | Bao et al. ...................... 370/389 |
| 2008/0268825 | A1 | 10/2008 | Allen et al. |

FOREIGN PATENT DOCUMENTS

EP   2009887 A1 * 12/2008
WO   0078019 A1   12/2000

OTHER PUBLICATIONS

Extended European Search Report dated Jun. 21, 2010. In corresponding application No. 10151593.0.
Examination report mailed May 21, 2012, in corresponding European patent application No. 10151593.0.
Office Action mailed May 31, 2013, in corresponding Canadian patent application No. 2,721,541.
Notice of Allowance mailed Jan. 13, 2014; in corresponding Canadian patent application No. 2,721,541.
Intention to grant mailed Feb. 21, 2013; in corresponding European patent application No. 10151593.0.

* cited by examiner

*Primary Examiner* — Ahmad F Matar
*Assistant Examiner* — Jirapon Intavong
(74) *Attorney, Agent, or Firm* — Novak Druce Connolly Bove + Quigg LLP

(57) ABSTRACT

Third party call control in a service management platform (SMP) of an enterprise system comprising a private branch exchange (PBX) in communication with the SMP over a trunk and line. Receiving a request over the line for communication involving a device. Invoking reliable transmission of provisional responses in the trunk. Receiving a receive only session description over the trunk. Invoking specific event notification between the SMP and PBX for calls answered between the device and PBX. Receiving notification of a call answered between the device and PBX. Responding to the request with the first session description as a send/receive offer. Receiving acknowledgement including a second send/receive answer session description over the line. Updating the trunk the second description as a send/receive update. Receiving a third session description with a successful response message from the PBX; the third session description being a send and receive copy of the first session description.

15 Claims, 9 Drawing Sheets

EXPEDITED MEDIA INTERCONNECTION IN THIRD PARTY CALL CONTROL

FIELD OF THE TECHNOLOGY

The technology disclosed herein (the "technology") relates interconnecting media between a caller and a callee. In some embodiments the technology relates to signaling under third party call control.

BRIEF DESCRIPTION OF THE DRAWINGS

Collectively, FIG. 8A

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology. Other aspects of the present technology will be apparent to those of ordinary skill in the art from a review of the following detailed description in conjunction with the drawings. Embodiments of the present technology are not limited to any particular operating system, mobile device architecture, server architecture, or computer programming language.

The present technology relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Figure 1:
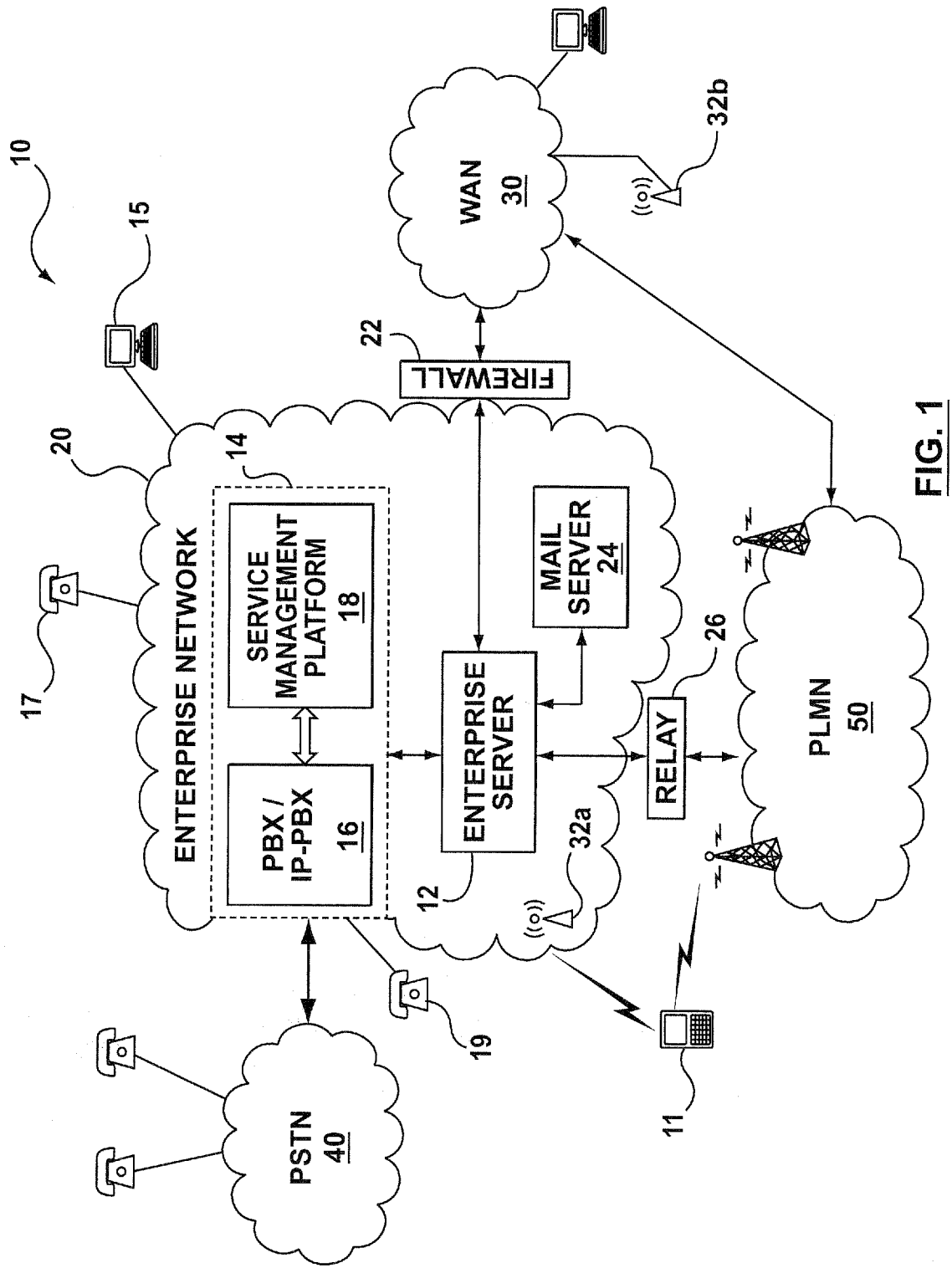
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the device moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address.

Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an Internet Protocol (IP)-PBX, for simplicity the description herein uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use Integrated Services Digital Network (ISDN) signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as are known to those of skill in the art and may be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
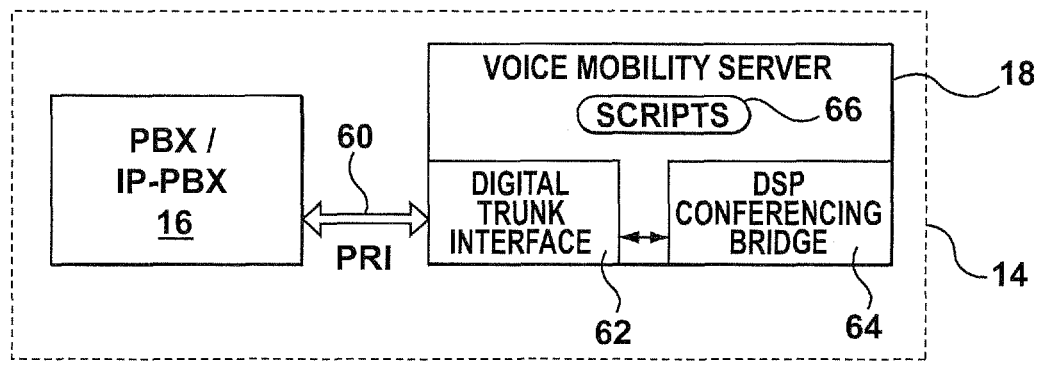
FIG. 2 shows, in block diagram form, further details of an embodiment of the enterprise communications platform.
Figure 3:
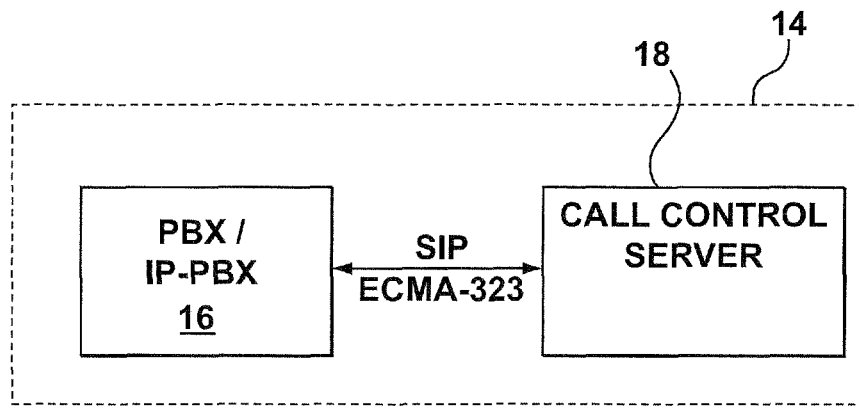
FIG. 3 shows another embodiment of the enterprise communications platform.
Figure 4:
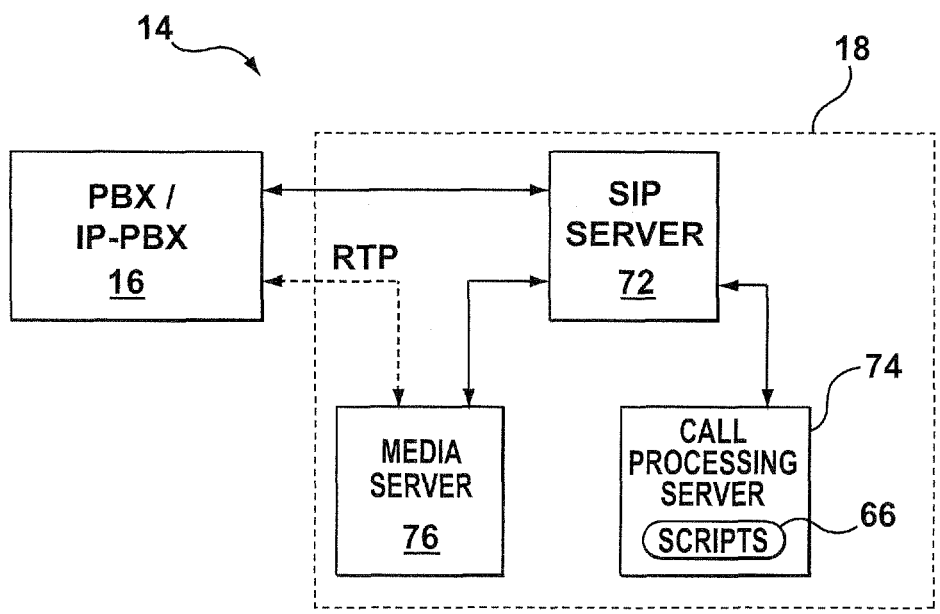
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control." Many of the media handling functions normally implemented by the PBX 16 can be handled by the SMP 18 in this architecture. Incoming calls addressed to any extension or direct dial number within the enterprise, for example, can be first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 may be implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts 66 or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msm1-07, Aug. 7, 2008. The media server 76 may be configured to perform Host Media Processing (HMP). Other architectures or configurations for the enterprise communications system 14 will be appreciated by those of ordinarily skilled in the art.

Figure 5:
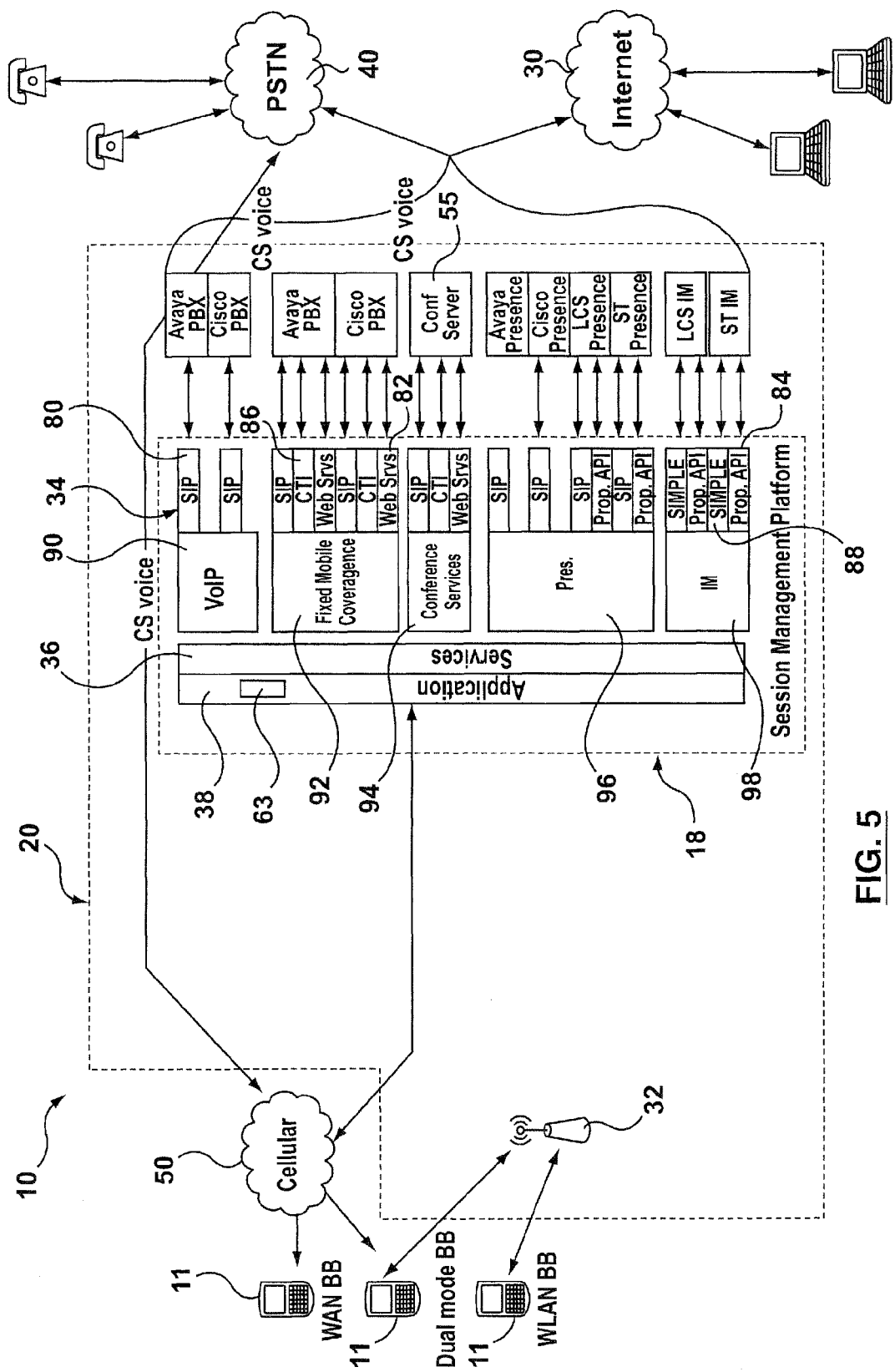
FIG. 5 shows further details of the enterprise communications platform of FIG. 3.

Reference is now made to FIG. 5, which shows an embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interfaces operating in accordance with various protocol, each interface configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which are further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 provides for two interfaces for signaling: SIP-Trunk (hereinafter referred to as "SIP-T") and SIP-Line (hereinafter referred to as "SIP-L"). The SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. The conference call server 55 can be configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIG. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

Figure 6A:
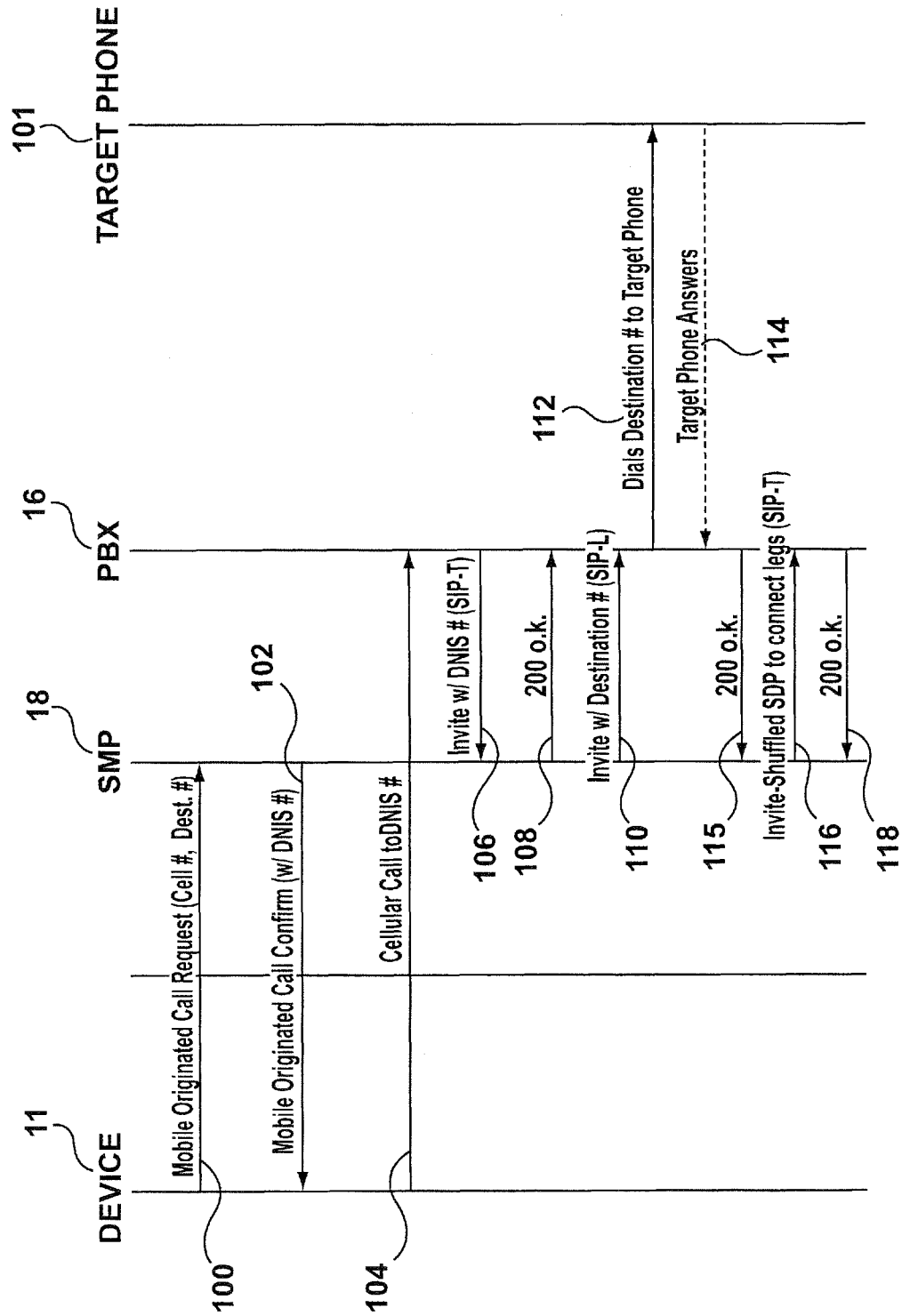
FIG. 6A is a signaling diagram generally indicating how mobile-originated, mobile-initiated calls are processed by the network of FIG. 5.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In other embodiments, the call request may be sent via the PLMN/PSTN through the PBX 16, for example as an SMS message or using another messaging operation. The SMP 18 confirms the call request by sending the Dailed Number Identification Service (DNIS) number to the device 11 (block 102). Next, the device 11 makes a cellular call using the DNIS number, which is received by the PBX 16 (block 104). As the PBX 16 has been configured to route calls with that DNIS to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 answers, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the device can play ringing tones. These ringing tones may be provided by the PBX 16 using the presentation of early media from the outgoing call leg, or they may be generated locally on the device 11 if early media is not available. In the latter case, it will be necessary to localize the ringing tone to match the tone normally heard with a call through the PBX 16.

Figure 6B:
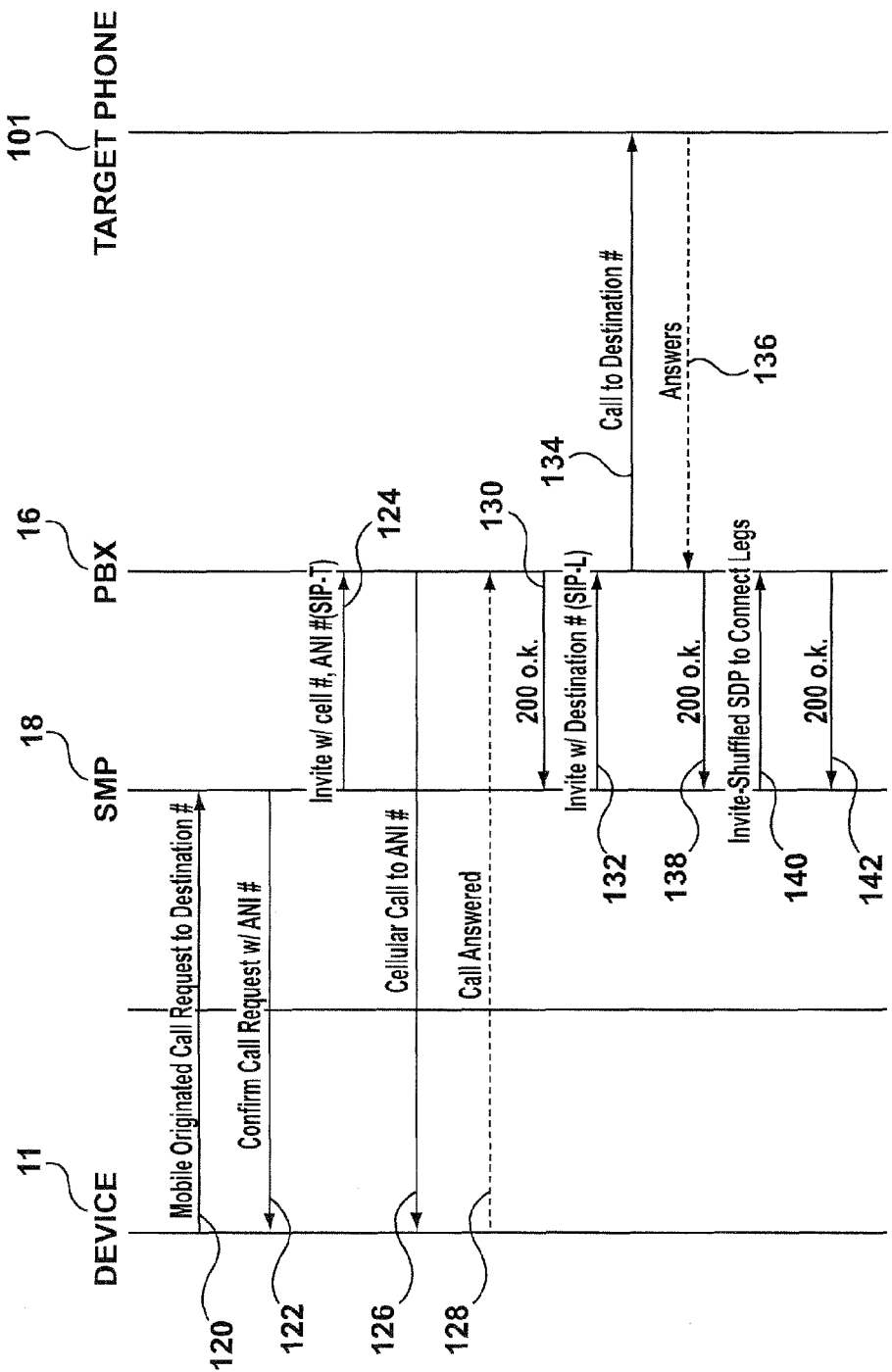
FIG. 6B is a signaling diagram generally indicating how mobile-originated, PBX-initiated, calls are processed by the network of FIG. 5.

The above description is known as a "mobile initiated" call, because the SMP 18 provides the mobile device 11 with the DNIS number into which the mobile device 11 has called and the mobile device 11 initiates the call to the PBX 16. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an Automatic Number Identification (ANI) number (block 122), which the mobile device will use to identify the incoming call from the PBX 16. The SMP 18 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16, i.e., that the ANI matches the ANI in the CONFIRM sent by the SMP in block 122. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 7A:
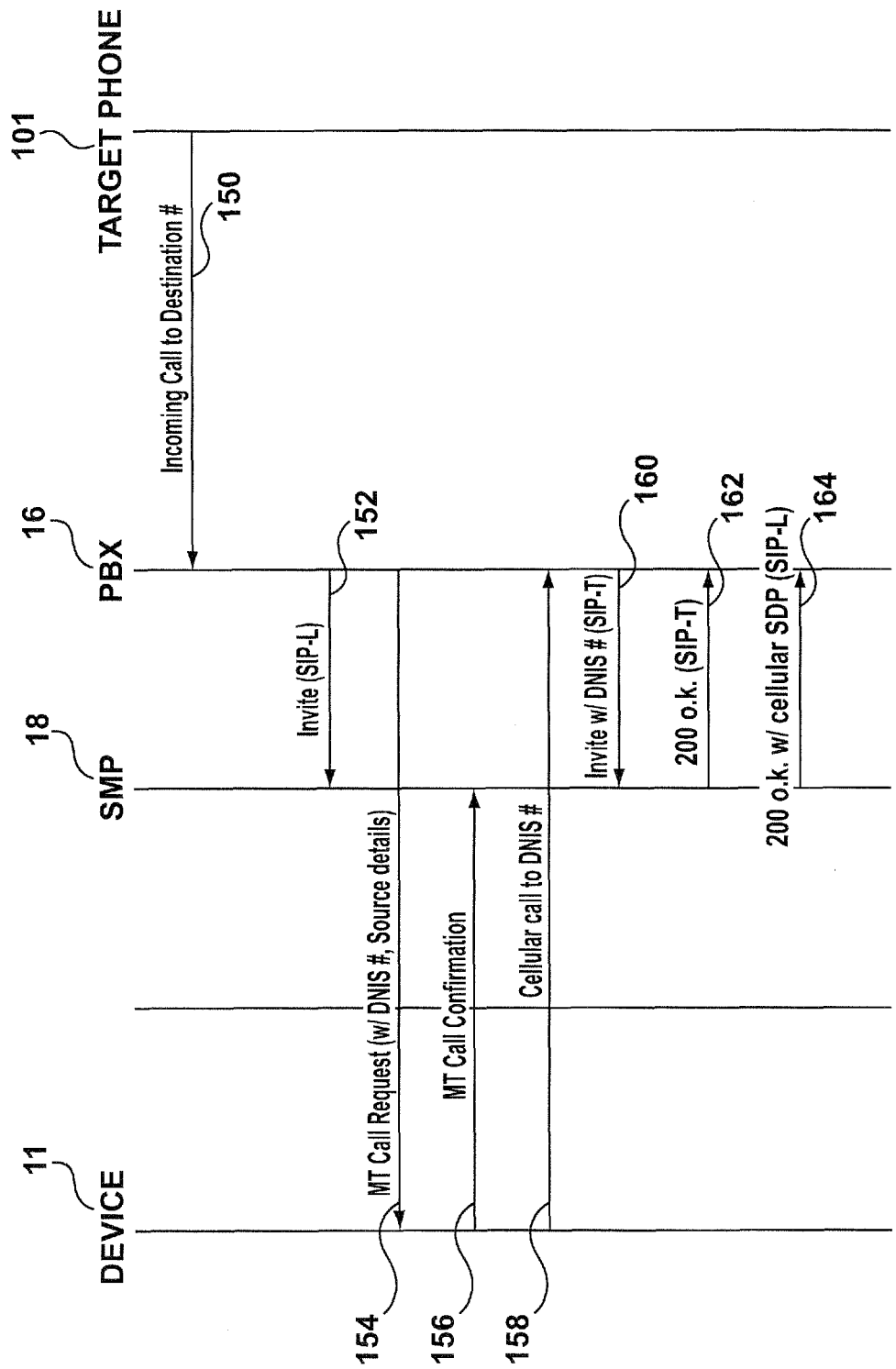
FIG. 7A is a signaling diagram generally indicating how mobile-terminated, mobile-initiated calls are processed by the network of FIG. 5.
Figure 7B:
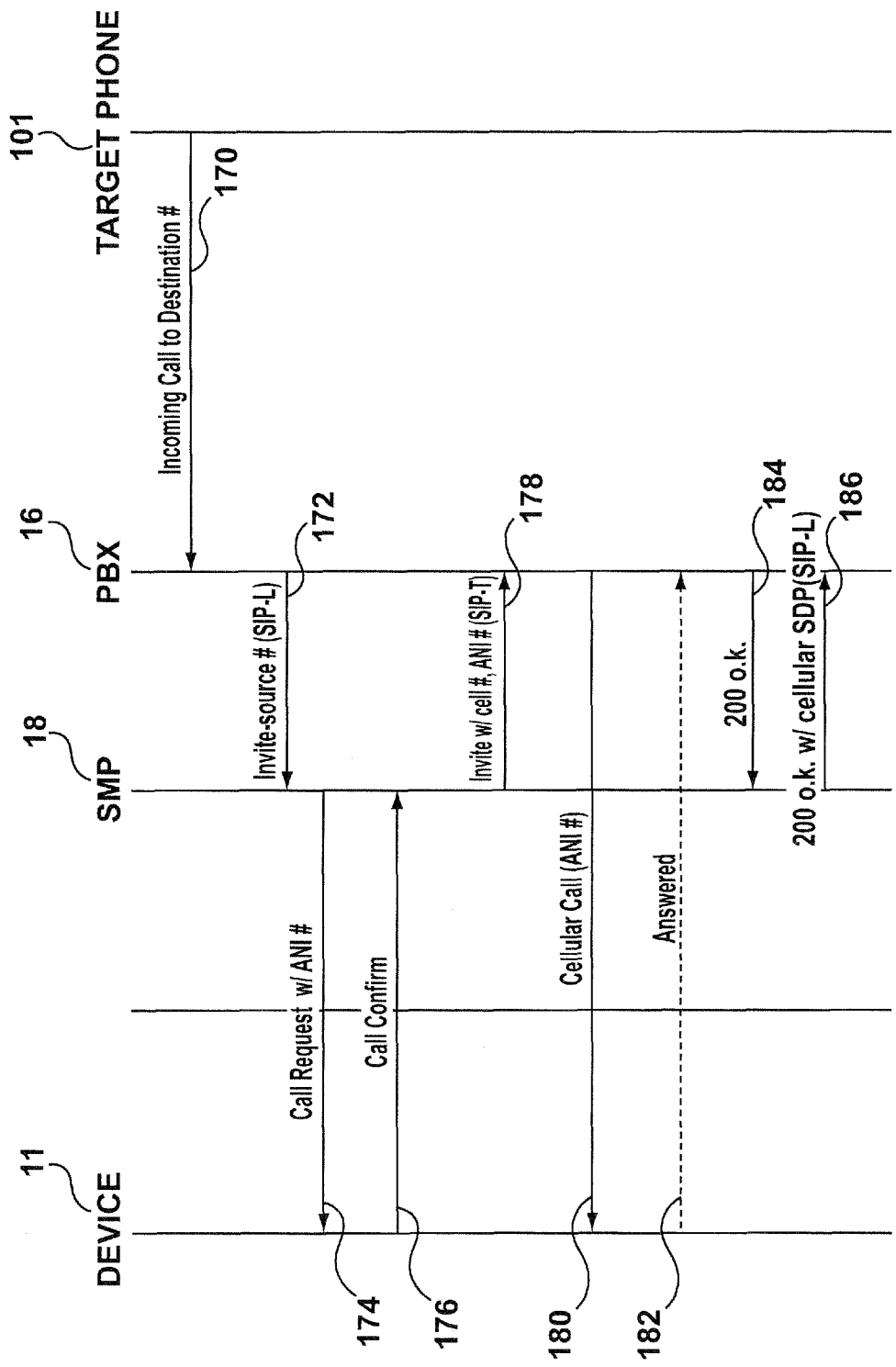
FIG. 7B is a signaling diagram generally indicating how mobile-terminated, PBX-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call, which will send a call to the mobile device. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the DNIS number at the PBX 16 into which to call. However, it is also possible to employ a "PBX-initiated" mobile terminated call, as shown in FIG. 7B, where the PBX 16 sends an incoming call to the device 11, using the SMP 18, with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 6A and 6B, the SMP 18 remains in control of the signaling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present technology, they will not be discussed in further detail.

In each of the examples above, the SMP (while not in the media path between the caller, callee, and PBX) remains in the signaling path among the participants. The SMP manipulates call flows through SIP messages and SDPs. Generally, an incoming enterprise call to an enterprise-associated mobile device 11 is setup by first receiving the incoming call at a PBX line with late offer (no audio information in the SIP message invite), and by setting up the mobile device 11 leg of the circuit, in part by using the SIP connection between the SMP and the PBX. Once the mobile device 11 leg of the circuit is connected to the PBX, the SMP shuffles the audio with SIP messages between parties of the call to perform voice connection.

In the case where the mobile device 11 is roaming, the PBX delivers the invite for an incoming call as a late offer. Therefore, the SMP does not have the port to which media, e.g., Real-time Transport Protocol (RTP) messages, from the mobile device 11 leg should be sent until the final acknowledgement, thus losing media that arrives from the caller before the SMP can act on the acknowledgement.

Consider the following scenario. Device A calls Device B; Device B is roaming. Device A communicates with the SMP and a cellular call leg is established between Device A and the PBX. Once the Device A call leg is acknowledged, the SMP begins to establish a PBX line call to Device B. However, the PBX will not allocate media resources to the Device B call leg just yet, so the SMP does not have media resource information (e.g., an SDP) to provide to Device B.

Device B is now answered and a may begin receiving audio input. However, until the acknowledgement from Device B reaches the SMP, and the SMP communicates with the PBX, there is no PBX media resource allocated to the Device B call leg between Device B and the PBX. The amount of time that it takes to allocate a media resource to this leg can be significant, e.g., shown to be up to two (2) seconds—especially where Device B is roaming. In some cases, one or both of the caller and the callee devices may be roaming.

Under these circumstances, early media offer is not supported for SIP PBX LINE calls, so it cannot be used to obtain an early offer and be put into cellular TRUNK call. The SMP may obtain SIP LINE audio information (codecs, IP address, RTP port) after answering SIP LINE call. However, in most billing schemes, the caller party will be billed for a failed call, not only for a successful call. Also, answering a SIP LINE call prior to establishing cellular callback to the device may break access to PBX features, such as shared line and enterprise voice mail.

The present technology accelerates the media connection between the participants utilizing SIP PRACK per IETF Request For Comments (RFC) 3262 Reliability of Provisional Responses in the Session Initiation Protocol.

Figure 8A:
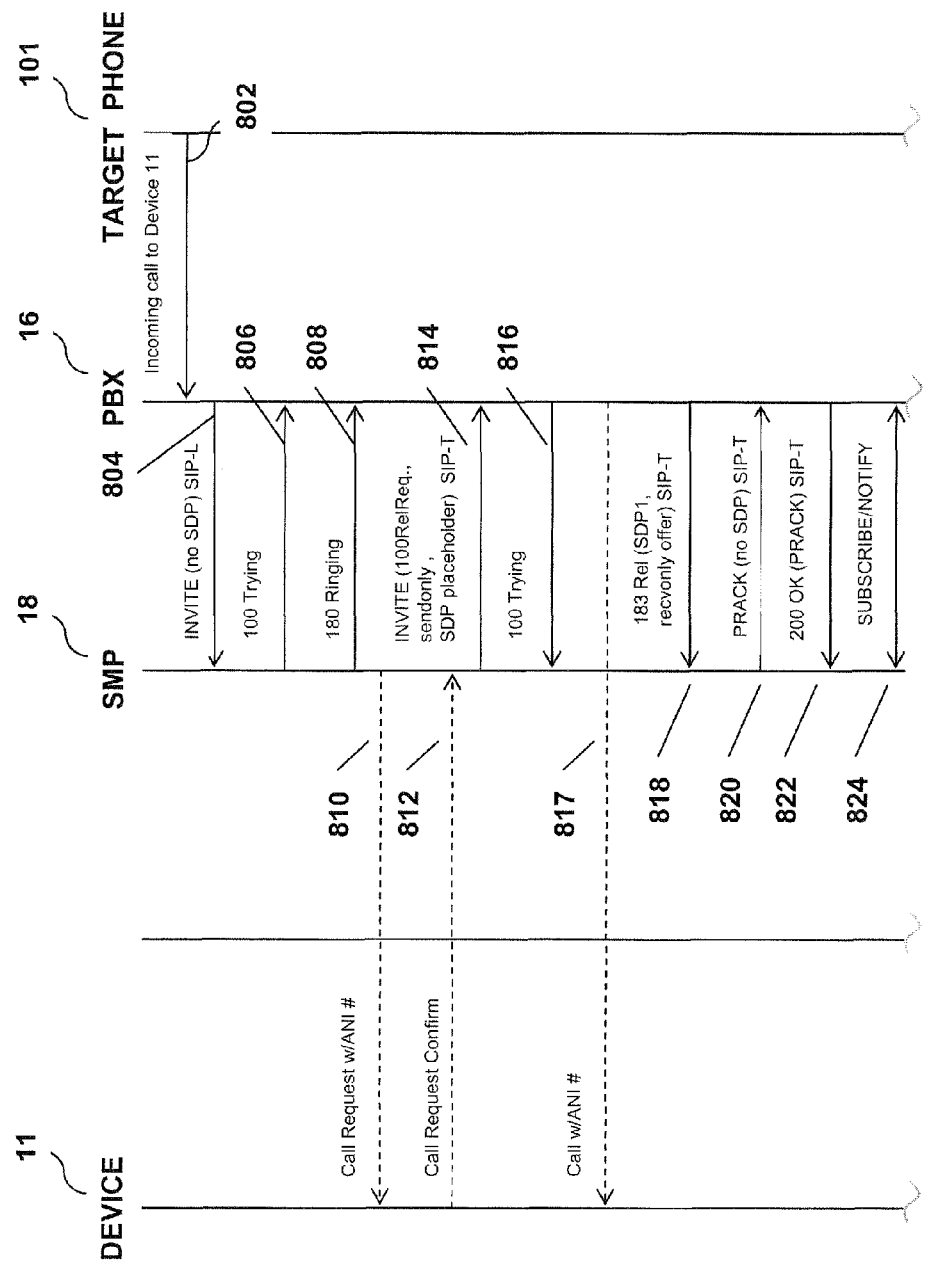
FIG. 8B is a signaling diagram generally indicating how media interconnection can be established.
Figure 8B:
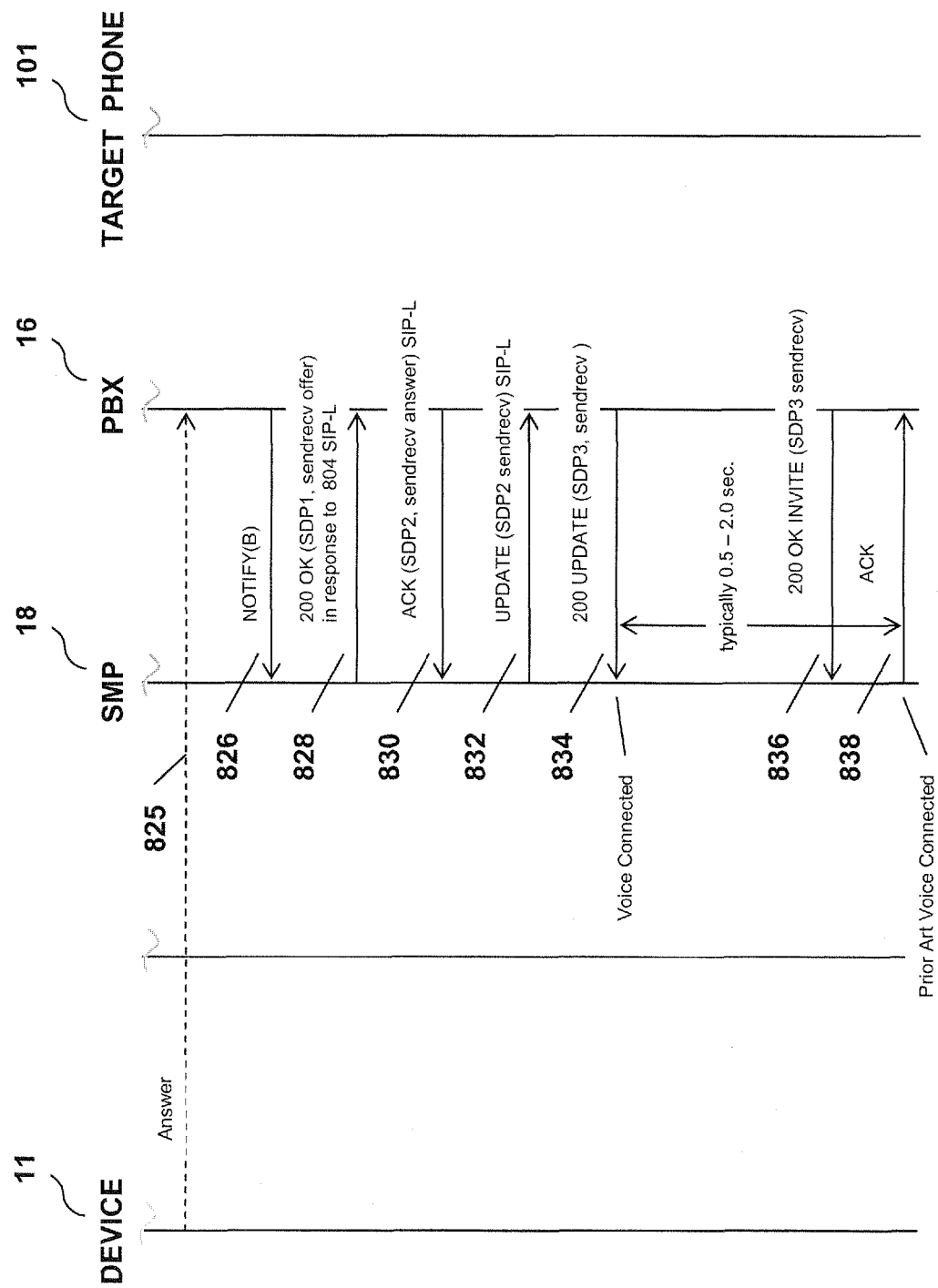

Referring to FIGS. 8A and 8B, a signaling diagram generally indicating how a mobile-terminated PBX-initiated call can be processed under the present technology to accelerate a media connection between the participants is presented. In accordance with the present technology, a call to the mobile device 11 registered with the SMP is received at the PBX 16 (block 802). The PBX 16 sends a SIP invite message to the SMP 18 over the SIP-L interface (block 804) since the mobile device 11 is associated with the SMP 18. However, the PBX 16 does not offer media resources, e.g., no valid session description in SDP format in the body of the invite message. The SMP 18 responds with SIP messages 100 trying (block 806) and 180 ringing (block 808).

The SMP 18 notifies the device 11 using a call request with the ANI number of the call that the mobile device 11 can expect from the PBX 16 (block 810), and the device 11 acknowledges the call request (block 812). The request and confirm can be in SIP, or a similar protocol. In some embodiments, this communication between the SMP 18 and the device 11 can be via the enterprise server 12.

The SMP 18 initiates a cellular callback (e.g., from the PBX 16 to the device 11) over PBX SIP-T using RFC 3262 "100Rel Required," sendonly connection mode, and a placeholder SDP (block 814). Table 1 illustrates such a placeholder SDP.

TABLE 1

| SDP Placeholder: (814) |
|---|
| Content-Type: application/sdp |
| Content-Length: 235 |
| v=0 |
| o=user 2000 0 IN IP4 X.X.X.X |
| s=SMP 2.0 Session |
| c=IN IP4 X.X.X.X |
| t=0 0 |
| m=audio 20000 RTP/AVP 0 8 18 9 |
| a=rtpmap:0 PCMU/8000 |
| a=rtpmap:8 PCMA/8000 |
| a=rtpmap:18 G729/8000 |
| a=rtpmap:9 G722/8000 |
| a=sendonly |

The PBX 16 responds to the SMP with SIP message 100 trying (block 816). The PBX 16 will place a cellular call to the device 11 in response to this invite (block 817). The PBX 16 also replies (block 818) to the SMP over SIP-T with an 18×reliable response including a valid SDP (SDP1) because the SMP 18 indicated "100RelReq" in block 814. Table 2 illustrates an SDP1.

TABLE 2

SDP1 (from TRUNK) (818)
---
Content-Type: application/sdp
Content-Length: 214
v=0
o=CiscoSystemsCCM-SIP 2000 1 IN IP4
Y.Y.Y.Y
s=SIP Call
c=IN IP4 Z.Z.Z.Z
t=0 0
m=audio 26268 RTP/AVP 0 101
a=rtpmap:0 PCMU/8000
a=ptime:20
a=rtpmap:101 telephone-event/8000
a=fmtp:101 0-15
a=recvonly This reply is acknowledged to the PBX 16 by an RFC 3262 PRACK message (block 820) from the SMP 18. The PBX sends the 200 OK message called for by a PRACK acknowledgement (block 822). A two-way subscription under Key Pad Stimulus Protocol (KPML) is established between the SMP 18 and the device 11 (via the PBX) for SMP call control and monitoring by using the SIP SUBSCRIBE/NOTIFY message (block 824).

Referring to FIG. 8B, the SMP 18 then waits for notification message (block 826) from the PBX 16, indicating that the device 11 has been answered by a user (block 825). For calls to a roaming device 11, this notification message will arrive prior to the call being connected from a signaling point of view, in part because the notify message is based on key pad stimulus, e.g., tones received by the PBX 16 from the device 11 (e.g., block 825).

After receiving notice that the cellular leg is answered, the SMP 18 answers the incoming call leg (originally offered at block 804) using a SIP 200 OK message with the SDP1 provided by the PBX 16 in block 818 (block 828), but as send/receive. Table 3 illustrates this SDP. This is a swap or shuffle of SDP from the SIP-T to SIP-L. Further, this is a send/receive offer and is typically the point at which call billing starts.

TABLE 3

SDP1 senrecv to LINE: (828)
---
Content-Type: application/sdp
Content-Length: 214
v=0
o=CiscoSystemsCCM-SIP 2000 1 IN IP4
Y.Y.Y.Y
s=SIP Call
c=IN IP4 Z.Z.Z.Z
t=0 0
m=audio 26268 RTP/AVP 0 101
a=rtpmap:0 PCMU/8000
a=ptime:20
a=rtpmap:101 telephone-event/8000
a=fmtp:101 0-15
a=SENDRECV In response, the PBX allocates media resources for the incoming call leg using a SIP ACK message containing SDP2 as an answer to the offer of block 828 (block 830). Table 4 illustrates an SDP2 of this message in embodiments in accordance with the present example.

TABLE 4

SDP2 (PORT IS DIFFERENT) LINE, (830)
---
Content-Type: application/sdp
Content-Length: 214
v=0
o=CiscoSystemsCCM-SIP 2000 0 IN IP4
Y.Y.Y.Y
s=SIP Call
c=IN IP4 Z.Z.Z.Z
t=0 0
m=audio 26323 RTP/AVP 0 101
a=rtpmap:0 PCMU/8000
a=ptime:20
a=rtpmap:101 telephone-event/8000
a=fmtp:101 0-15

Using the SIP Update method of RFC 3311, the SMP 18 sends SDP2 back to the PBX 16 (block 832). Table 5 illustrates an SDP2 of this message in embodiments in accordance with the present example.

TABLE 5

SDP2 832
---
Content-Type: application/sdp
Content-Length: 214
v=0
o=CiscoSystemsCCM-SIP 2000 0 IN IP4
Y.Y.Y.Y
s=SIP Call
c=IN IP4 Z.Z.Z.Z
t=0 0
m=audio 26323 RTP/AVP 0 101
a=rtpmap:0 PCMU/8000
a=ptime:20
a=rtpmap:101 telephone-event/8000
a=fmtp:101 0-15

Once the PBX acknowledges the update (block 834) the audio path between the caller 101 and the device 11 is connected. Table 6 illustrates an SDP3 of this message in embodiments in accordance with the present example. This SDP is the same as SDP1 in block 818, except that it is send/receive. The audio connection happens earlier that the primary rate interface (PRI) CONNECT is received when one or both of the calls are roaming.

TABLE 6

834
---
Content-Type: application/sdp
Content-Length: 214
v=0
o=CiscoSystemsCCM-SIP 2000 1 IN IP4
Y.Y.Y.Y
s=SIP Call
c=IN IP4 Z.Z.Z.Z
t=0 0
m=audio 26268 RTP/AVP 0 101
a=rtpmap:0 PCMU/8000
a=ptime:20
a=rtpmap:101 telephone-event/8000
a=fmtp:101 0-15

Note that the acknowledgement (block 838) to the update of block 834 comes after the 200 OK response (block 836) confirming the connection.

At least in part by swapping SDPs in this fashion, the technology has been shown to connect the target phone 101 and the device 11 up to two (2) seconds earlier than media channels for each call leg would otherwise be connected. While the exemplary embodiment described herein is in the context of a mobile-terminated/PBX-initiated scenario, one of ordinary skill in the art would readily understand how to apply the principles of the technology to other scenarios such as mobile-terminated/mobile-initiated, mobile-originated/mobile-initiated, and mobile-originated/PBX-initiated.

The present technology can take the form of hardware, software or both hardware and software elements. In some embodiments, the technology is implemented in software, which includes but is not limited to firmware, resident software, microcode, a Field Programmable Gate Array (FPGA) or an Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

What is claimed is:

1. A computer-implemented method for third party call control, the method comprising:

in a service management platform (SMP) of an enterprise system, the enterprise system comprising a private branch exchange (PBX) in communication with the SMP over a trunk interface and a line interface:

receiving, over the line interface, a first request for communication involving an enterprise-associated mobile device managed by the SMP;

invoking, in the trunk interface, reliable transmission of provisional responses over the trunk interface;

receiving, over the trunk interface, a first session description, the first session description being a receive-only offer;

invoking specific event notification between the SMP and PBX for calls answered between the device and the PBX;

receiving notification of a call answered between the device and the PBX;

responding to the first request with the first session description as a send and receive offer;

receiving, over the line interface, acknowledgement of the first response, the acknowledgement including a second session description as a send and receive answer;

updating the trunk interface with the second session description as a send and receive update; and receiving a third session description in conjunction with a successful response message from the PBX, the third session description being a send and receive copy of the first session description.

2. The computer-implemented method of claim 1, wherein the communication between the SMP and PBX is conducted in accordance with Internet Engineering Task Force (IETF) Session Initiation Protocol (SIP).

3. The computer-implemented method of claim 1, wherein: the specific event notification is conducted in accordance with Key Pad Stimulus Protocol.

4. The computer-implemented method of claim 1, wherein: the enterprise system is configured for a PBX-initiated PBX/device call leg.

5. The computer-implemented method of claim 1, wherein: the enterprise system is configured for a device-initiated PBX/device call leg.

6. A computer program product for third party call control in a service management platform (SMP) of an enterprise system, the enterprise system comprising a private branch exchange (PBX) in communication with the SMP over a trunk interface and a line interface, the computer program product comprising:

at least one computer readable medium; and at least one program module, wherein the at least one program module is stored on the at least one medium, and wherein the at least one program module is operable, upon execution by a processor to:

receive, over the line interface, a first request for communication involving an enterprise-associated mobile device managed by the SMP;

invoke, in the trunk interface, reliable transmission of provisional responses over the trunk interface;

receive, over the trunk interface, a first session description, the first session description being receive-only offer;

invoke specific event notification between the SMP and PBX for calls answered between the device and the PBX;

receive notification of a call answered between the device and the PBX;

respond to the first request with the first session description as a send and receive offer;

receive, over the line interface, acknowledgement of the first response, the acknowledgement including a second session description as a send and receive answer;

update the trunk interface with the second session description as a send and receive update; and receive a third session description in conjunction with a successful response message from the PBX, the third session description being a send and receive copy of the first session description.

7. The computer program product of claim 6, wherein the communication between the SMP and PBX is conducted in accordance with Internet Engineering Task Force (IETF) Session Initiation Protocol (SIP).

8. The computer program product of claim 6, wherein: the specific event notification is conducted in accordance with Key Pad Stimulus Protocol.

9. The computer program product of claim 6, wherein: the enterprise system is configured for a PBX-initiated PBX/device call leg.

10. The computer program product of claim 6, wherein: the enterprise system is configured for a device-initiated PBX/device call leg.

11. A system for third party call control, the system comprising:

at least one processor, at least one computer readable medium in communication with the processor; and at least one program module, wherein the at least one program module is stored on the at least one medium, and wherein the at least one program module is operable, upon execution by the processor to:

receive, over the line interface, a first request for communication involving an enterprise-associated mobile device managed by the SMP;

invoke, in the trunk interface, reliable transmission of provisional responses over the trunk interface;

receive, over the trunk interface, a first session description, the first session description being receive-only offer;

invoke specific event notification between the SMP and PBX for calls answered between the device and the PBX;

receive notification of a call answered between the device and the PBX;

respond to the first request with the first session description as a send and receive offer;

receive, over the line interface, acknowledgement of the first response, the acknowledgement including a second session description as a send and receive answer;

update the trunk interface with the second session description as a send and receive update; and receive a third session description in conjunction with a successful response message from the PBX, the third session description being a send and receive copy of the first session description.

12. The system of claim 11, wherein the communication between the SMP and PBX is conducted in accordance with Internet Engineering Task Force (IETF) Session Initiation Protocol (SIP).

13. The system of claim 11, wherein: the specific event notification is conducted in accordance with Key Pad Stimulus Protocol.

14. The system of claim 11, wherein: the enterprise system is configured for a PBX-initiated PBX/device call leg.

15. The system of claim 11, wherein: the enterprise system is configured for a device-initiated PBX/device call leg.

* * * * *